United States Patent [19]

Imon

[11] 4,044,849
[45] Aug. 30, 1977

[54] STEERING CONTROL APPARATUS FOR USE IN ENDLESS TRACK TYPE TRACTORS AND CONTROL VALVE FOR USE THEREWITH

[75] Inventor: Kazutoshi Imon, Komatsu, Japan

[73] Assignee: Kabushiki Kaisha Komatsu Seisakusho, Tokyo, Japan

[21] Appl. No.: 652,994

[22] Filed: Jan. 28, 1976

[30] Foreign Application Priority Data

Aug. 20, 1975 Japan .................................. 50-100089

[51] Int. Cl.² ............................................. B62D 11/00
[52] U.S. Cl. ................................... 180/6.7; 192/13 R
[58] Field of Search ................ 180/6.7, 6.2; 192/13 R, 192/87.13, 87.18

[56] References Cited

U.S. PATENT DOCUMENTS

| 2,259,794 | 10/1941 | Boldt | 192/13 R |
| 2,615,542 | 10/1952 | Tourneau | 180/6.2 X |
| 3,494,449 | 2/1970 | Umeda | 192/13 R |
| 3,831,725 | 8/1974 | Schott | 192/87.13 |

Primary Examiner—Robert R. Song
Assistant Examiner—R. Schrecengost
Attorney, Agent, or Firm—Armstrong, Nikaido & Marmelstein

[57] ABSTRACT

A steering control apparatus for use in endless track type tractor which comprises a pair of control members, a barrel rotatably mounted on a stationary shaft, said control members being fixedly secured to the barrel, a pair of valve connecting levers fixedly secured to the barrel, a valve for steering control clutch for releasing the clutch when actuated, the valve having stems mounted at both ends thereof, and a pair of clutch yokes for releasing clutches when actuated, the clutch yokes being connected to the valve.

11 Claims, 11 Drawing Figures

STEERING CONTROL APPARATUS FOR USE IN ENDLESS TRACK TYPE TRACTORS AND CONTROL VALVE FOR USE THEREWITH

BACKGROUND OF THE INVENTION

This invention relates to a steering control apparatus for use in endless track type tractor and a valve of mono-spool type for use therewith.

A controlling gear for use in an endless track type tractor comprising two sets of steering members which enables steering, turning and braking of the tractor is described in Japanese Patent Publication No. 020,125/72.

A control valve for releasing a steering control clutch described in the Japanese Patent Publication No. 020,125/72 referred to above is installed on each of steering clutches on both sides of the tractor, and is of a type that, when either of two sets of steering clutch releasing control valves is selectively rendered operative, a fluid pressure releasing force is transmitted to the steering clutch to be actuated, while when the two steering clutch releasing control valves are operated individually or at the same time, they provide a control action such that transmission of the fluid pressure releasing forces to the steering clutches on both sides thereof is interrupted.

For this reason the steering control valve is disadvantageous in that it is complicated in construction and requires much labour and time for manufacture, and also the steering control system is complicated and tends to cause troubles.

SUMMARY OF THE INVENTION

In accordance with the present invention, a steering control apparatus for an endless track type tractor is provided comprising a pair of control members, a barrel rotatably mounted on a stationary shaft, said control members being fixedly secured on said barrel, a pair of valve connecting levers fixedly secured to said barrel, a valve means for the steering control clutch for releasing said clutch when actuated, said valve means having stem members at both sides thereof, said stem members being connected to the other sides of said valve connecting levers, and a pair of clutch yokes for releasing clutches when actuated, said clutch yokes being connected to said valve means.

Another feature of the present invention includes a control valve for use with said steering control apparatus, comprising a valve body having an inlet port for fluid, a pair of fluid supply ports to the right and left clutches for release thereof, and a pair of drain ports, a spool slidably disposed in said valve body to selectively open and close each of said ports, a pair of chambers located at both ends of said spool in said valve body, a pair of stem members slidably and coaxially disposed with said spool in said valve body at both ends thereof, and a pair of spring means disposed in said chambers.

It is, therefore, an object of the present invention to provide a steering control apparatus for an endless track type tractor which utilizes a mono-spool type valve.

It is another object of the present invention to provide a control valve for releasing a clutch in the steering control apparatus of an endless track type tractor and such a control valve which can selectively release right and left steering clutches by using a mono-spool type valve.

It is still another object of the present invention to provide a control valve for releasing a clutch in the steering control apparatus of an endless track type tractor and such a control valve which has simplified valve configuration to simplify the steering control system.

Other objects, features and advantages of the present invention will be readily apparent from the following description taken in conjunction with the following drawings.

DETAILED DESCRIPTION OF THE PREFERRED EMBODIMENTS

Figure 1:
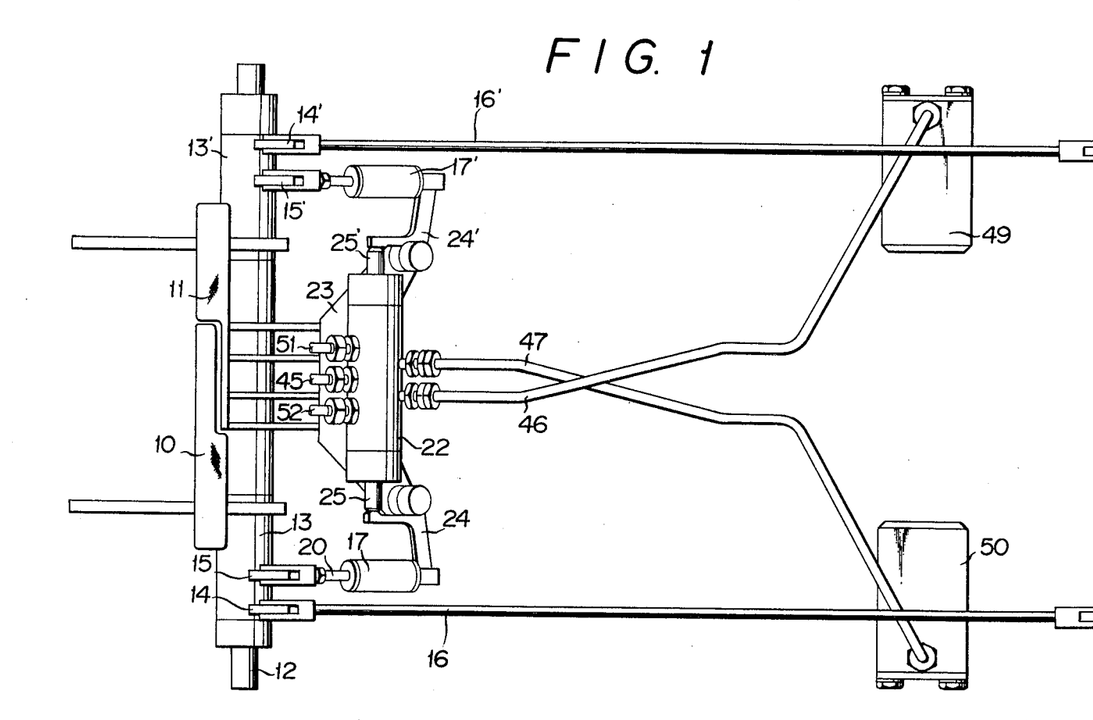
FIG. 1 is a schematic plan view of the present invention showing steering apparatus.
Figure 3A:
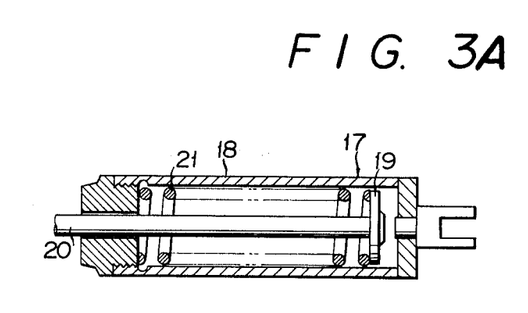
FIG. 3(A) is a longitudinal sectional view of the loose spring employed in the present invention.

Referring to FIG. 1, a couple of steering members 10 and 11 are shown which are included in each of control link devices (each comprising a steering clutch releasing control valve) adapted to render the steering clutches and the steering brakes on both sides of the tractor operative in turn, and also operate the steering brakes at the same time. The control link devices on the left and right sides are substantially identical in construction, and therefore only the control link device on the left side is described in detail hereinbelow. In the left hand control link device, the steering member 10 is fixedly secured to a barrel 13 rotatably mounted on a stationary support shaft 12, and is adapted to turn counterclockwise when viewed from the left hand in the drawing. The steering member 10 is normally biased in a clockwise direction by a spring not shown and is held in an operating position. The rotary barrel 13 has fixedly secured thereto a brake connecting lever 14 and a valve connecting lever 15. The brake connecting lever 14 is connected to one end of a brake operating rod 16, and the valve connecting lever 15 is also connected to one end of a loose spring 17 for actuating the clutch. The clutch actuating loose spring 17 comprises, as shown in FIG. 3 (A), a driven cylindrical member 18, a driving rod 20 having a spring retainer 19 and fitted in the cylindrical member 18 so as to slide freely therein, and a spring resiliently mounted between the cylindrical member 18 and the spring retainer 19. The resilient force provided by the interposed spring serves to operate a bell crank 24 connected to the cylindrical member 18. Reference numeral 22 denotes a control valve for releasing the steering clutch according to the present invention. The control valve 22 is fixedly secured on a support base 23 projected horizontally with respect to the stationary shaft 12 in parallel relationship with the latter, and arrangement is constructed such that the bell crank 24 pivotally mounted at the end of the support base 23 urges a stem member 25. The stem member 25 is not subjected to the above-mentioned pushing or urging action of the control link device and the steering clutch releasing control valve 22 is disposed at a neutral position when the steering member is positioned to be pulled in clockwise direction.

Now, the control valve for releasing the steering clutch according to the present invention will be described in detail below.

The control valve 22 is characterized in that it comprises a housing having formed therein an inlet port for fluid under pressure, ports for supplying fluid under pressure to either side of the steering clutch and fluid outlet ports, a single spool or mono-spool, slidably fitted, in said housing in such a manner as to selectively connect and disconnect said ports, a pair of compression springs of the same construction and each being mounted at both ends of said spool to provide biasing forces in opposite directions to hold said spool in a neutral position, and a pair of stem members adapted to adjust the loading of said compression springs thereby achieving the control on movement and change-over of said spool. Various embodiments of the control valve 22 will be described with reference to FIGS. 4 to 10.

Figure 3B:
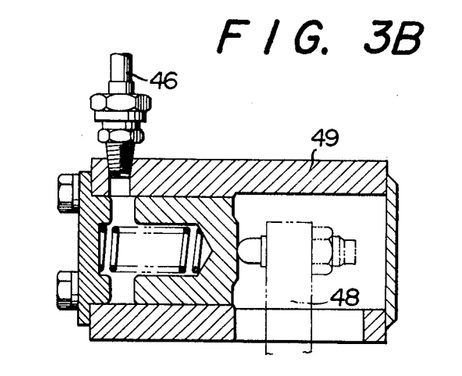
FIG. 3(B) is a longitudinal sectional view of the construction of operating piston of the steering clutch releasing yoke employed in the present invention.

In the drawing, reference numeral 30 denotes a valve housing which is counterbored and fitted with seals 31 and 32, respectively, at both ends thereof. Covers 33 and 34 are screwed in the housing so as to tightly engage and compress the seals 31 and 32 whereby defining sealed chambers 35 and 36. The valve housing 30 has formed therein a spool accommodating hole 37, a pressurized fluid inlet port 38, ports 39, 40 through which pressurized fluid is supplied for releasing the left and right hand clutches, drain ports 41 and 42, and fluid outlet ports 43 and 44. The fluid inlet port 38 is connected with a pressurized fluid supply source by a conduit 45 shown in FIG. 1. Conduits 46 and 47 serve to connect the ports 39 and 40 through which pressurized fluid is supplied to release the steering clutch with pistons 49 and 50 of a steering clutch releasing york 48 (only one side of which is shown in FIG. 3 (B).) Conduits 51 and 52 serve to connect the drain ports 41 and 42 with a tank not shown.

Figure 4:
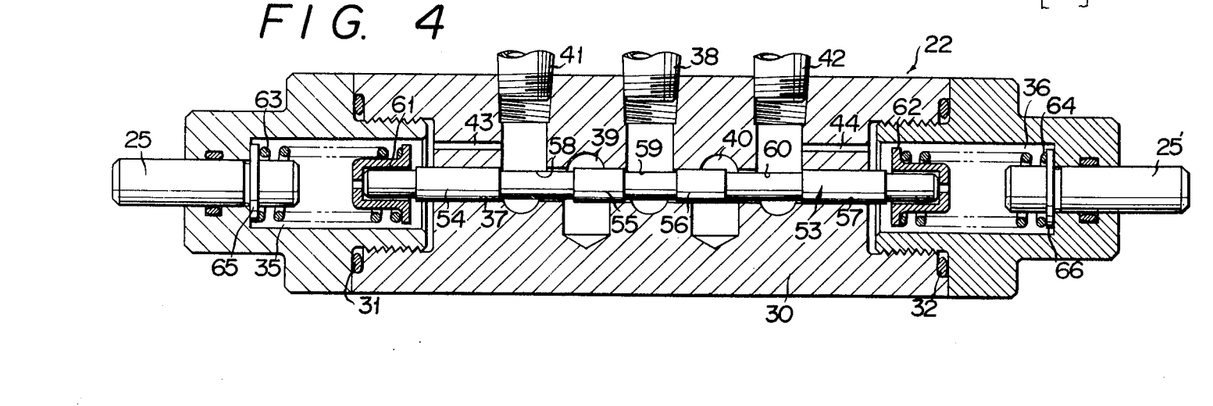
FIG. 4 to FIG. 7 are longitudinal sectional views of the steering clutch releasing valves employed in the present invention.

Slidably mounted in the hole 37 is a single spool 53 which comprises land portions 54, 55, 56 and 57 and annular groove portions 58, 59 and 60. Spring retainers 61 and 62 are mounted at both ends of the spool 53 so as to be subjected to the biasing loads of compression springs 63 and 64 accommodated in the chambers 35 and 36 thereby to hold the spool 53 in a neutral position. Stem members 25 and 25' having spring retainers 65 and 66, respectively, extend through the covers 33 and 34 so that they can slide freely therein and loadings are imposed to the compression springs 63 and 64. In the neutral position as shown in FIG. 4, the land portions 55 and 56 of the mono-spool 53 close the fluid inlet port 38 so as to maintain the pressure of the pressurized fluid supply source.

The operation of the above-mentioned embodiment will now be described hereinbelow.

By operating the steering member 10 on one hand in the control link device, a resilient drag link device 17 excerts a resilient force on the bell crank 24 to swing the latter so that the latter urges the stem member 25.

The urging action of the bell crank 24 increases the biasing load of the compression spring 63 to such an extent that it overcomes the resilient force excerted by the compression spring 64 on the other side thereby moving the mono-spool 53 to the right. Thus, the land portion 56 cuts the drain port 42 off from communication with the fluid supply port 40 and communicates the fluid inlet port 38 with the fluid supply port 40 so that fluid under high pressure is supplied through the conduit 47 to the operating piston 50 of the steering clutch releasing yokes on one side to release the steering clutch thereby. Subsequently, the resilient spring 21 of the resilient drag link device is retracted so as to idly move the driving rod 20 connected to the clutch connecting lever 15 so that the steering member 10 on one side can be urged further and the brake operating rod 16 can be subsequently pulled to apply the steering brake on that side.

If the steering member 11 on the opposite side is operated, then the land portion 55 of the mono-spool 53 cuts the drain port 41 off from communication with the fluid supply port 39, and allows the fluid inlet port 38 to communicate with the fluid supply port 39 so that fluid under high pressure is fed through the conduit 46 to the operating piston 49 of the steering clutch releasing york on the other side to release the steering clutch thereby. The operation of the steering brake after the release of the steering clutch is as mentioned hereinabove.

Thus, the operation of the steering members in succession enables interlocked controls to be achieved by applying the steering brake after the steering clutch is released.

Next, when both steering members 10 and 11 are operated at the same time, then the stem members 25 and 25' mounted at the ends of the steering clutch control valve are permitted to move in the opposite directions to hold a mono-spool in the neutral position.

At that time, the land portions 55 and 56 shut off the fluid inlet port 38 so that no fluid under high pressure is supplied to the operating pistons 49 and 50 of the steering clutch releasing yokes on both sides and therefore the steering clutches cannot be released. The brake operating rods 16 and 16' will pull the brake levers by the idle movements of the resilient drag links 17 and 17' so that the steering brakes on both sides can be applied.

Figure 5:
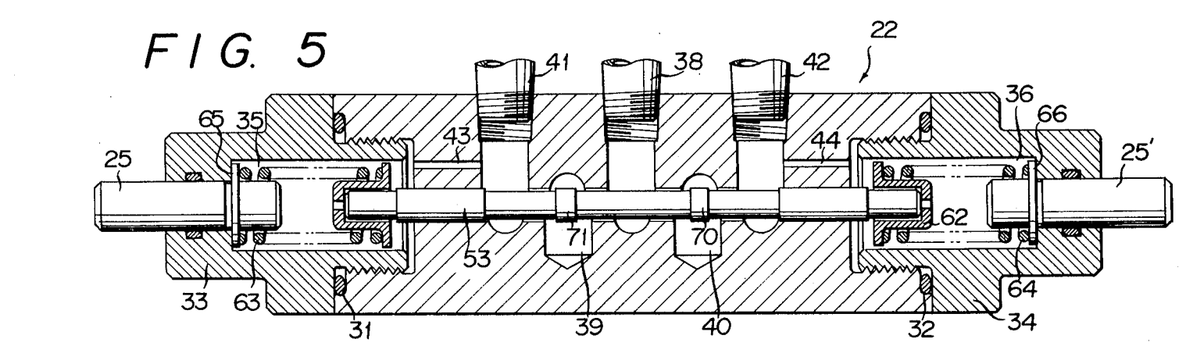

FIG. 5 illustrates the second embodiment of the present invention. The construction and function of this embodiment will be described below only with regard to the parts thereof substantially different from those of the first embodiment mentioned above.

In this embodiment, different from the first embodiment, when the mono-spool occupies the neutral position, the fluid inlet port 38 is not closed, but open so as to communicate with the drain ports 41 and 42.

Thus, the mono-spool 53 is moved to the right by the operation already mentioned, land portion 70 shuts the drain port 42 off from communication with the fluid inlet port 38, whilst land portion 71 shuts fluid supply port 39 on the other side off from communication with the fluid inlet port 38 and forms a closed circuit wherein only the fluid supply port 40 on one side is allowed to communicate with the fluid inlet port 38.

Whilst, the mono-spool 53 is moved to the left, a closed circuit is formed in which only the communication between the fluid inlet port 38 and the fluid supply port 39 is obtained.

Thus, fluid under pressure is selectively supplied to either of the steering clutches on both sides to release the steering clutches.

Figure 6:
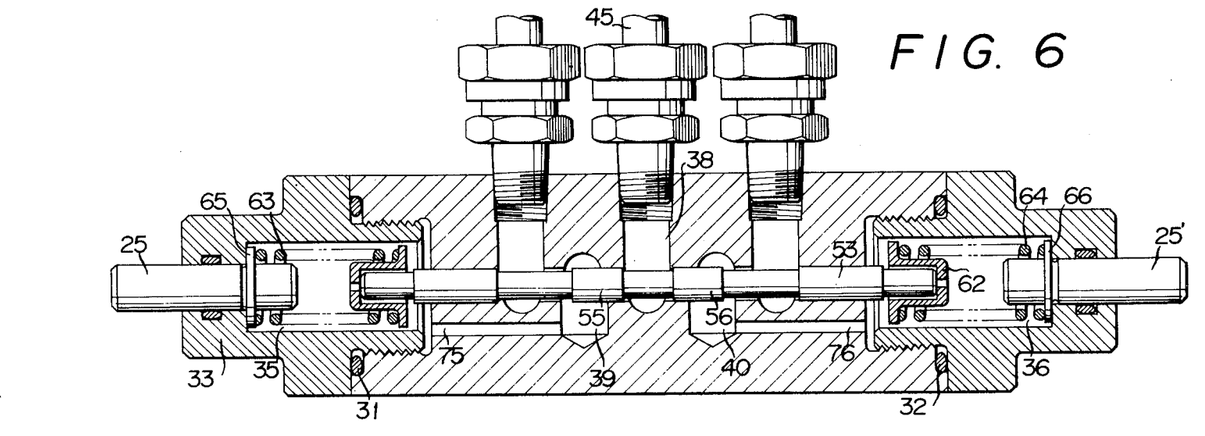

FIG. 6 shows the third embodiment of the present invention, and only the parts thereof which are different in construction and function from those of the first embodiment will be described below.

In this embodiment, as with the case of the first embodiment, land portions 55 and 56 shut off the fluid inlet port 38 so as to maintain the pressure of the pressurized fluid supply source. In this embodiment, however, the passages 43 and 44 shown in FIG. 5 are eliminated, and discharge passages 75 and 76 which connect the fluid supply ports 39 and 40 with the chambers 35 and 36, respectively, are additionally formed.

In this arrangement, when a loading is applied to the compression spring 63 to move the spool 53 to the right, then the loading is subjected to a resistance comprising the fluid pressure within the chamber 36 and the leftward resilient force of the compression spring 64 therein so that the pressure within the fluid supply port 40 is exerted on the right hand end of the mono-spool 53 whereby adjusting the pressure of the fluid which flows through the fluid inlet port 38 into the fluid supply port 40.

When a load is applied to the compression spring 36, the fluid pressure within the fluid supply port 39 is exerted through the passage 75 on the left hand end of the spool 53, contrary to the above-mentioned case.

Thus, the pressure of the fluid within the fluid supply port 40 or 39 is determined dependent upon the loading applied to the compression spring 36 or 35 whereby a reduced pressure control condition is achieved by means of the mono-spool 53.

Therefore, the adjustment of the stroke of the stem member by operating the steering members 10 or 11 enables the fluid pressure within the fluid supply port 39 or 40 to be regulated properly and the steering clutch to be completely disengaged from a half-clutch condition.

Figure 7:
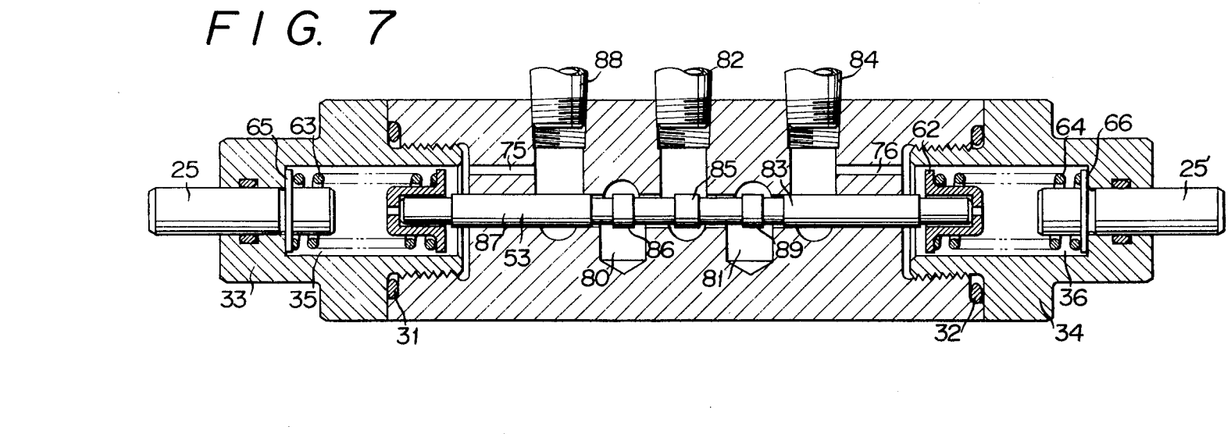

FIG. 7 illustrates the fourth embodiment of the present invention, and only the parts which are different in construction and function from those of the third embodiment will be described below.

This embodiment is adapted to control the fluid pressure within fluid supply ports for releasing steering clutches as with the case of the third embodiment. In comparing with the third embodiment, an arrangement is provided such that when the mono-spool 53 is disposed at a neutral position, both inlet ports 80 and 81 are not closed, but open so as to communicate with a drain port 82.

Thus, with the mono-spool 53 moved to the right, land portion 83 serves to open a fluid supply port 84, the other land portion 85 shuts off a fluid inlet port 81 from communication with a drain port 82, and land portion 86 shuts off another fluid inlet port 80 from communication with the drain port 82 thereby forming a closed circuit for hydraulic fluid.

As the mono-spool 53 is moved to the left, land portion 87 opens a fluid supply port 88, land portion 85 shuts off the fluid inlet port 80 from communication with the drain port 82, and land portion 89 shuts off another fluid inlet port 81 from communication with the drain port 82 thereby forming a closed circuit for pressurized fluid.

Thus, the fluid pressure is exerted on the left hand end or the right hand end of the mono-spool 53 through either of the discharge passages 75 and 76 which lead from the fluid supply ports 84 and 86 to the chambers 35 and 36, respectively, so that the reduced pressure control condition similar to that of the third embodiment can be ensured.

Figure 8:
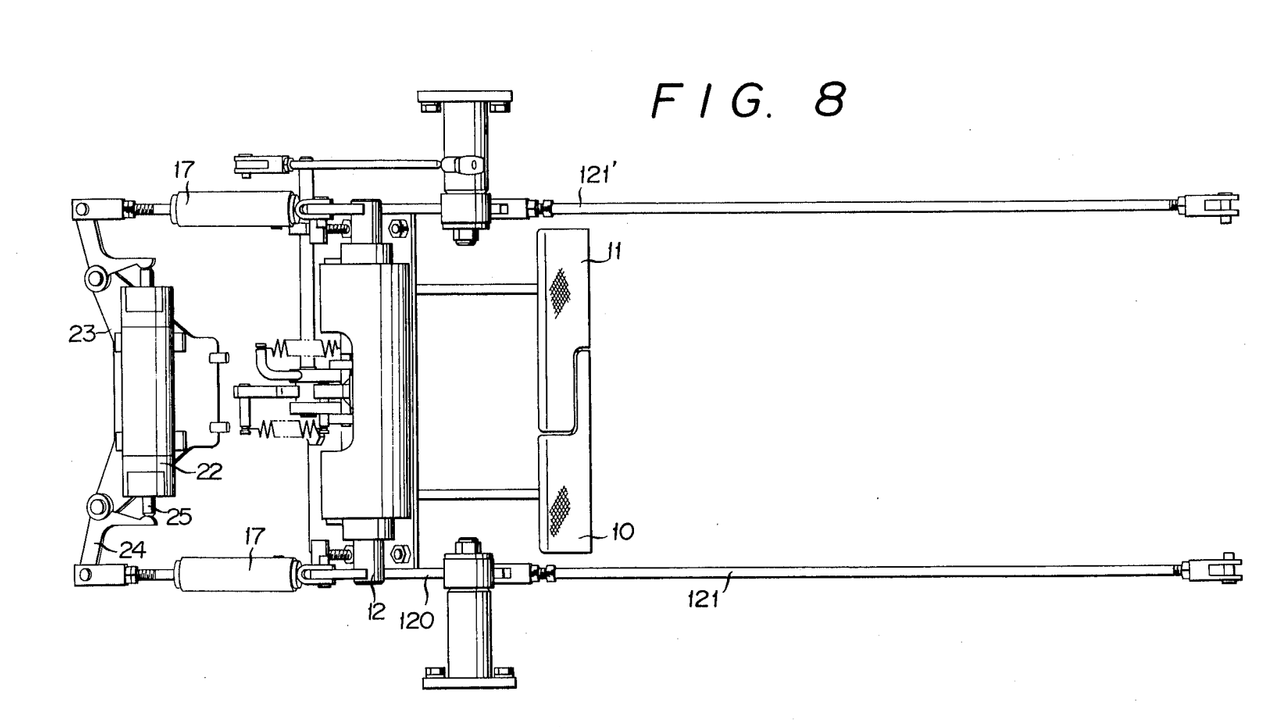
FIG. 8 is a schematic plan view of another embodiment of the steering gear of the present invention.
Figure 9:
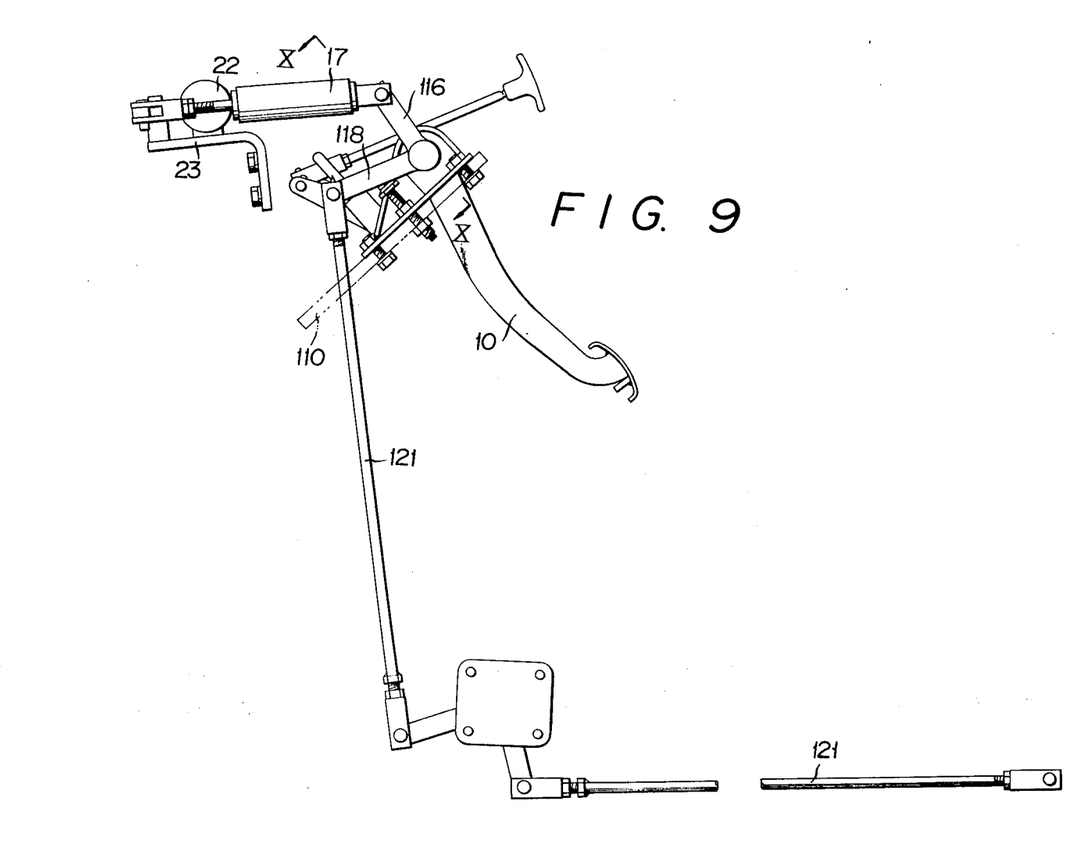
FIG. 9 is a side view of FIG. 8.
Figure 10:
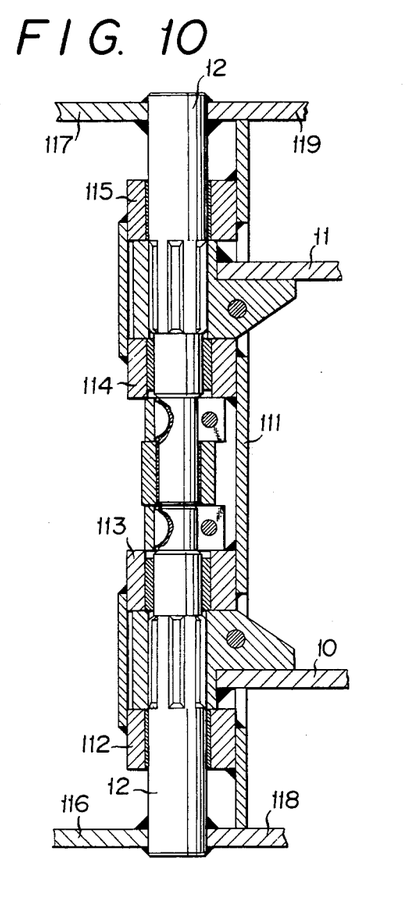
FIG. 10 is a cross sectional view taken along the line X—X of FIG. 9.

FIGS. 8 to 10 illustrate alternative embodiments of steering gears according to the present invention which can be used with the mono-spool shown in FIGS. 4 to 8.

Figure 2:
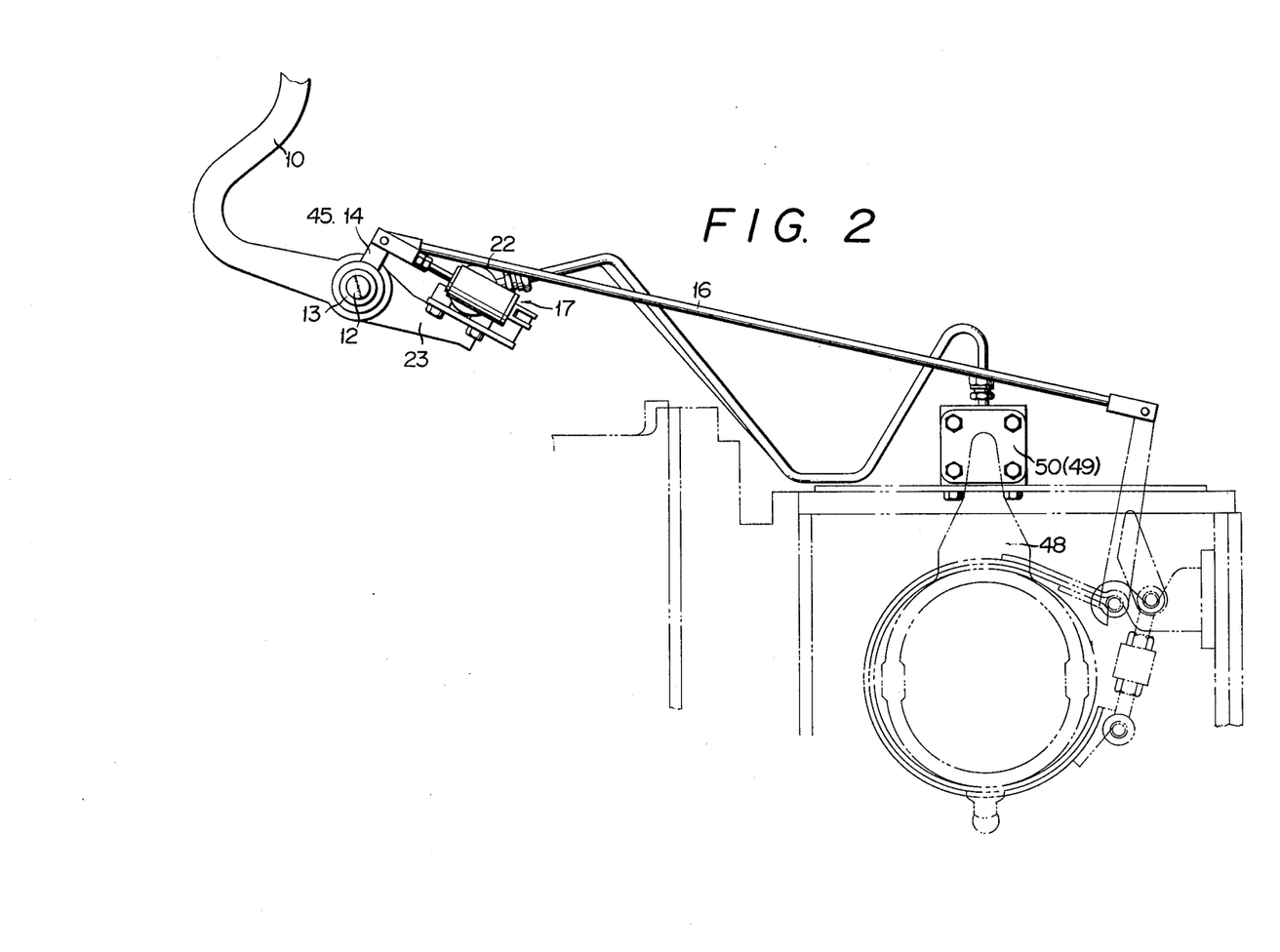
FIG. 2 is a side view of FIG. 1.

This embodiment differs mainly from the steering gears of FIGS. 1 to 3 in that in this embodiment steering members 10 and 11 are mounted to hang down in front of the driver's cab of an endless track type vehicle. The steering members 10 and 11 are fitted to a base 110 projecting out from the inner wall of the frame in front of the driver's cab with unit construction as shown in FIG. 10. In this unit construction, a support base 111 is provided, as shown, which has fixedly secured thereto spaced apart bearings 112, 113, 114 and 15, and has also a pair of shafts 12, 12 rotatably mounted. The left and right hand steering members 10 and 11 are spline-connected to respective shafts 12, 12. Reference numerals 116 and 117 denote connecting rods for controlling the steering clutches on the left and right sides, respectively, and reference numerals 118 and 119 represent connecting rods for controlling the steering brakes on the left and right sides, respectively. When the left hand steering member 10 is stepped down, the connecting lever 116 urges the stem 25 of the mono-spool type control valve 22 through the loose spring means 17 and the bell crank 24 shown in FIG. 8 to actuate the control valve 22.

Further, the left hand steering clutch (not shown) is actuated through the connecting lever 118 and the rods 120 and 121. The loose spring means is identical in construction and function to those of the embodiment of FIG. 3 (A).

Thus, when the left hand steering member 10 is depressed, the steering clutch is disengaged in the first instance. With the steering member 10 depressed further, the barrel 18 of the loose spring means 17 is moved idly, and the left hand steering brake is actuated.

What is claimed is:
1. A steering control apparatus for an endless track type tractor comprising a pair of control members,
   a barrel rotatably mounted on a stationary shaft, said control members being fixedly secured to said barrel,
   a pair of valve connecting levers fixedly secured to said barrel on a first side thereof,
   a driving rod connected to a second side of each said valve connecting levers,
   a spring means connecting each said driving rod to a crank means,
   valve means for steering control clutch for releasing said clutch when actuated, said valve means having stem members mounted at both ends thereof, said stem members being connected to each of said crank means,
   a pair of clutch yokes for releasing clutches when actuated, said clutch yokes being connected to said valve means,
   wherein said valve means is of a mono-spool type,
   a pair of brakes, with a pair of brake connecting levers fixedly secured to said barrel, and
   means for biasing said control members in a clockwise direction.

2. A control valve for releasing a clutch in steering control apparatus of an endless track type tractor comprising a valve body having an inlet port for pressurized fluid, a pair of ports for supplying pressurized fluid to the right and left clutches to release one of them, and a pair of drain ports,
   a spool slidably disposed in said valve body to selectively open or close said each port, a pair of chambers defined at both ends of said spool in said valve body, a pair of stem members slidably and coaxially disposed with said spool in said valve body at both ends thereof for slidable actuation of said spool, and a pair of spring means disposed in said chambers between said spool and said stem members.

3. A control valve for releasing a clutch in steering control apparatus of an endless track type tractor of claim 2 wherein said spring means is balanced with each other.

4. A control valve of claim 2 further comprising means for communicating said fluid inlet port with one of said fluid supplying ports, means for disconnecting said fluid supplying port from one of said drain ports when one of said stem members is urged, and a conduit for connecting said drain port to said chamber.

5. A control valve of claim 4 further comprising means for disconnecting said fluid inlet port from the pair of fluid supplying ports when both of said stem members are urged.

6. A control valve of claim 2 further comprising a conduit for communicating said drain port with said chamber, and means for communicating said fluid inlet port with said drain port through said fluid supplying port.

7. A control valve of claim 6 further comprising means for disconnecting said fluid inlet port from one of said drain ports while maintaining communication between said inlet port and one of said fluid supplying ports, and means for disconnecting said inlet port from said other supplying port.

8. A control valve of claim 2 further comprising means for communicating said fluid inlet port with one of said fluid supplying ports, a conduit communicating said supplying port with said chamber, and means for regulating the pressure of fluid under pressure which flows from said inlet port into one of said fluid supplying ports.

9. A control valve for releasing a clutch in steering control apparatus of an endless track type tractor comprising a valve body having a pair of fluid inlet ports, a pair of ports for supplying fluid to the right and left hand clutches to release one of them, and a drain port, a spool slidably disposed in said valve body to selectively open or close each of said ports, a pair of chambers defined at both ends of said spool in said valve body, a pair of stem members slidably and coaxially disposed with said spool in said valve body at both ends thereof, and a pair of spring means disposed in said chambers, said spring means being adapted to balance with each other.

10. A control valve of claim 9 further comprising a conduit for communicating said fluid supplying port with said chamber, and means for communicating said fluid inlet port with said drain port.

11. A control valve of claim 10 further comprising a conduit for communicating said fluid inlet port with one of said fluid supplying ports, and means for disconnecting said inlet port from said drain port.

* * * * *